UNITED STATES PATENT OFFICE.

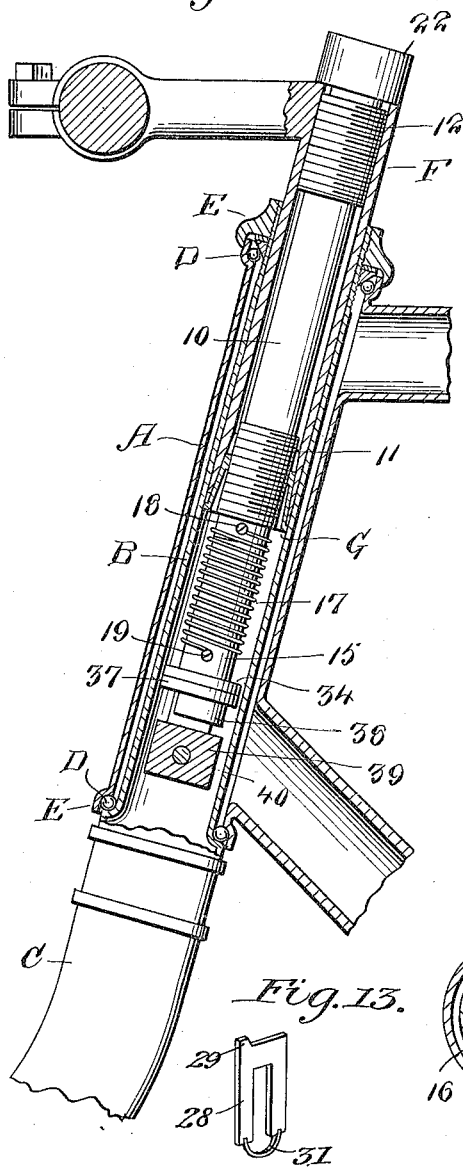
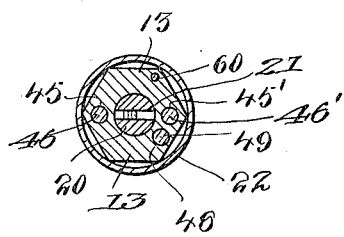
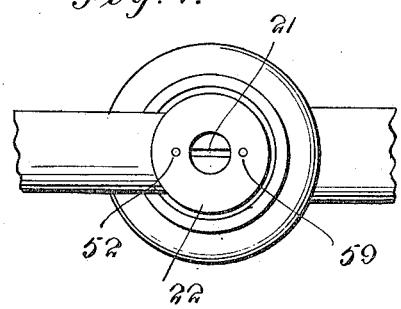
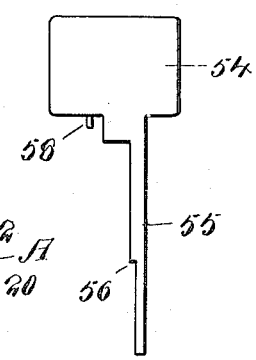
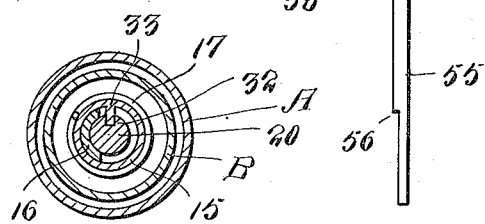

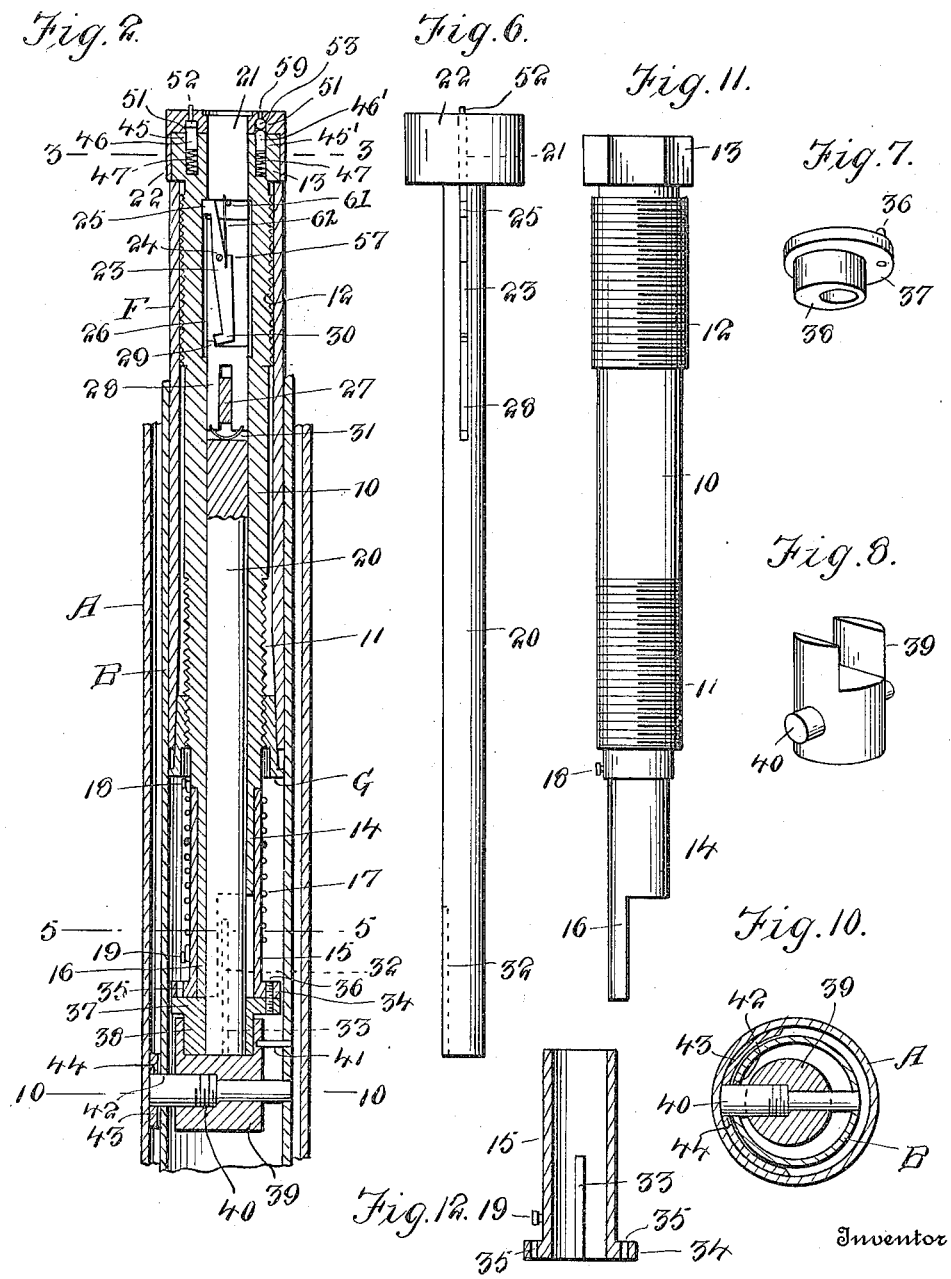
G. CROSTON.
STEERING WHEEL LOCK FOR BICYCLES, MOTOR CYCLES, OR THE LIKE.
APPLICATION FILED MAR. 24, 1914.
1,146,053.
Patented July 13, 1915.
2 SHEETS—SHEET 2.

GEORGE CROSTON, OF HOQUIAM, WASHINGTON.

STEERING-WHEEL LOCK FOR BICYCLES, MOTOR-CYCLES, OR THE LIKE.

1,146,053.　　　　　Specification of Letters Patent.　　Patented July 13, 1915.

Application filed March 24, 1914. Serial No. 826,927.

*To all whom it may concern:*

Be it known that I, GEORGE CROSTON, a citizen of the United States, residing at Hoquiam, in the county of Chehalis and State of Washington, have invented new and useful Improvements in Steering-Wheel Locks for Bicycles, Motor-Cycles, or the like, of which the following is a specification.

The invention relates to a lock, and more particularly to the class of locks for motor-cycles, bicycles, steering posts for automobiles, or other steering devices for vehicles or the like.

The primary object of the invention is the provision of a lock of this character wherein the steering column or post can be fastened against turning movement so that the front wheel of the motorcycle, or front wheels of the vehicle will be disposed across the natural line of travel thereof to prevent the theft of the same, the steering column or post being readily unlocked by the use of a key, and the said lock held in inoperative position so that the motorcycle or vehicle can be used without possibility of the accidental locking of the steering column or post thereof.

Another object of the invention is the provision of a lock of this character which can be readily and easily applied to the steering column or post of a motorcycle, bicycle, vehicle or the like without necessitating the changing of the parts thereof.

A further object of the invention is the provision of a lock of this character wherein the use of the key is obviated when it is desired to operate it for locking the steering column or post, yet if desired the said key can be used for this purpose, although the key may be only necessary to release the steering column or to actuate the lock to hold it inoperative.

A still further object of the invention is the provision of a lock which will serve as a part of the steering column or post, and will enable the automatic locking of the front wheel of the motorcycle, bicycle, or the front wheels of a vehicle to insure the same against surreptitious possession.

A still further object of the invention is the provision of a lock of this character which is extremely simple in construction, thoroughly reliable and efficient in its operation, novel in form, and also inexpensive in manufacture and installation.

With these and other objects in view, the invention consists in the construction, combination and arrangement of parts as will be hereinafter fully described, illustrated in the accompanying drawings, and pointed out in the claims hereunto appended.

In the drawings:—Figure 1 is a fragmentary vertical longitudinal sectional view through a motorcycle head, showing in elevation the lock constructed in accordance with the invention. Fig. 2 is a similar view with the lock shown in vertical section and the locking bolt in locked position. Fig. 3 is a transverse sectional view on the line 3—3 of Fig. 2. Fig. 4 is a top plan view of the head with the lock. Fig. 5 is a sectional view on the line 5—5 of Fig. 2. Fig. 6 is a side elevation of the turning rod of the lock. Fig. 7 is a perspective view of the eccentric. Fig. 8 is a perspective view of the locking yoke carrying the lock bolt. Fig. 9 is a side view of the key. Fig. 10 is a sectional view on the line 10—10 of Fig. 2. Fig. 11 is a side elevation of the tube of the lock. Fig. 12 is a vertical sectional view through the sleeve adapted to fit the lower end of the tube. Fig. 13 is a side elevation of the safety slide.

Similar reference characters indicate corresponding parts throughout the several views in the drawings.

Referring to the drawings in detail, A designates the tubular head of a motorcycle or bicycle frame, B the tubular stem or column of the steering fork C, D the ordinary ball bearings, E the cones therefor, F the handle bar post, and G the expander collar which is engaged in its inner end for the fastening of the handle bar post in the stem or column as usual, these parts being constructed and are assembled in the ordinary well-known manner.

The lock comprises a tube 10 having external threads 11 and 12, respectively, the latter threads being arranged contiguous to a hexagonal shaped head 13 which is adapted for the engagement of a wrench therewith, while the threads 11 are arranged spaced from the inner end of the tube 10, and the threads are adapted to engage, respectively, the expander column G and post F of the handle bar. In event that the expander collar G is not employed, the threads 12 are adapted to detachably engage corresponding threads formed internally of the post F of the handle bar for the mounting of the tube 10 in the steering stem or column B of the motorcycle or bicycle.

The tube 10 is formed with an inner reduced end 14 over which telescopes a sleeve 15, and is provided with a cut-away portion to form a semi-cylindrical shaped extension 16 over which fits the said sleeve 15 when engaged upon the reduced end 14 of the tube. Surrounding the sleeve 15 is a coiled expansion spring 17, one end of which is fixed to the tube 10 by means of a screw 18, while the opposite end of this spring 17 is fixed to the sleeve 15 by means of a screw 19 so that the said sleeve 15 will be held under tension of the spring for rotary motion when it is turned in a manner presently described.

Passed through the tube 10 is a turning rod or stem 20, the same being formed with a bifurcated outer end providing a keyway 21, and permanently fixed to this outer end of the rod or step 20 is an inverted cup-shaped cap 22 forming a housing which is adapted to receive the hexagonal shaped head 13 of the tube 10, while arranged within the keyway 21 is a locking dog or trigger 23, the same being swingingly supported upon a pivot 24 which permits the rocking thereof, the dog or trigger 23 being formed with a locking nose 25 which is adapted to engage in one of a pair of diametrically opposed channels or grooves 26 formed longitudinally in the inner face of the tube 10 so that the rod or stem 20 can be locked against turning movement within the tube.

Formed near the inner end of the guideway 21 is a medial transverse guide web 27 over which loosely fits a substantially inverted U-shaped slide 28, the same being formed with a nib 29 movable into the path of a lip 30 formed on the opposite end of the dog or trigger 23, and this nib 29 is adapted to engage the lip 30 when the nose 25 of the dog or trigger 23 is engaged in either channel or groove 26 to prevent the release of the rod or stem 20 until the said slide has been displaced for the turning of the stem or rod within the tube 10 in a manner presently described.

Within the guideway 21 at the inner end thereof is a bowed leaf spring 31, the ends of which engage in the slide 28, and this spring resiliently supports the latter and holds it normally in a position whereby the nib 29 thereon will engage the lip 30 on the trigger or dog 23 to prevent movement of the latter. The inner end of the turning rod or stem 20 is formed with a groove 32 which extends longitudinally thereof and opens through the said inner end and is exposed through the cut-away portion in the reduced end of the tube 10, while mounted in the sleeve 15 is a gib 33 which works in the cut away portion in the reduced end 14 of the tube 10 and engages in the groove 32 in the rod or stem 20 so that when the latter turns the sleeve will simultaneously rotate therewith.

The sleeve 15 at its free end is formed with an annular external rim 34 provided with holes 35 spaced from each other, in any one of which is adapted to engage a holding pin 36 in an eccentric disk 37, and in this manner the said disk can be adjusted relative to the sleeve 15, the disk 37 being formed with an eccentric 38 which engages in an eccentric yoke 39 having detachably mounted therein a locking bolt 40 disposed transversely therein, the yoke 39 being held in a vertical position within the steering stem or column B by means of a guide pin 41 working within a suitable guide opening formed in the said column or stem B, which is also provided with a bolt hole 42 adapted to aline with the bolt 40 so that it will project through the hole 42 for engagement in a keeper segment 43 permanently mounted interiorly of the motorcycle or bicycle head A, this segment 43 being formed with a recess 44 to receive the bolt 40 when the yoke 39 has been moved in one direction by the eccentric 38 on the turning of the rod or stem 20 when the lock is actuated in a manner presently described.

Formed in the hexagonal shaped head 13 at diametrically opposite points thereof are push pin sockets 45 and 45′ in which are disposed locking push pins 46 and 46′, respectively, the same being acted upon by means of coiled springs 47 seated within the sockets 45 and 45′ and working against the said pins, while spaced from and at one side of the socket 45′ is a similar socket 48 in which is arranged a locking push pin 49 acted upon similarly with respect to the pins 46 and 46′, and these pins 46, 46′ and 49, respectively, are adapted to engage in sockets 51 formed at diametrically opposite points in the inner face of the top of the cap 22, while within one of these sockets 51 is a headed push pin 52, the same being projected beyond the outer face of the top of the cap 22, while in the other socket 51 is loosely held a ball 53, the headed pin 52 and the said ball 53 being designed to displace the locking pins 46, 46′ and 49 for permitting the turning of the cap 22 on the insertion of a key in the keyway 21 in the turning rod or stem 20, the key being hereinafter fully described.

The key comprises a wing 54 from which projects a bit 55, the same being formed with a shoulder 56 which is adapted to engage a shoulder 57 on the dog or trigger 23 so that when forcing the bit 55 in the keyway 21 the free end thereof will displace the slide 28 to disengage its nib 29 from the lip 30 on the dog or trigger 23, and the shoulder 56 will act upon the shoulder 57 on the said dog or trigger to rock the same on its pivot 24 in a direction to disengage the nose 25 from the channel or groove 26 in which it is engaged, and thereby unlock the rod or stem 20 from the tube 10. The wing 54 of the key is formed with a lug 58 at one side of the bit 55, and this lug is adapted to pass through an aperture 59 in the top of the cap 22 for displacing the ball 53 a sufficient distance to bring the outer end of the locking pin 46' engaged in one of the sockets 51 in the cap flush with the hexagonal shaped head 13, while the wing 54 at the opposite side of the bit 55 will act upon the pin 52 to displace it so as to move the locking pin 45 flush with the said head 13, and thereby freeing the cap 22 from locking engagement with the head 13 to permit the free turning of the stem or rod 20 to control the lock within the steering column or post.

The bolt 40 when engaged in the recess 44 in the keeper segment 43 will lock the steering post of stem B in the head A of the motorcycle or bicycle frame so as to sustain the wheel in the front fork C at an angle to the straight line of travel thereof, and in this manner the motorcycle or bicycle cannot be surreptitiously moved by riding the same in the usual manner for the theft thereof.

Slidably mounted in a suitable guideway in the hexagonal shaped head 13 is a pin 60 which is adapted to engage in the upper end of the handle bar post F so as to prevent the turning of the tube 10 when engaged in the expander collar G, thereby avoiding the possibility of the tube 10 becoming loose within the motorcycle or bicycle head, or its removal therefrom.

At the outer ends of the grooves or channels 26 and intersecting the same is an annular shallow groove 61 which is not as deep as the said grooves or channels 26, and connected to the trigger or dog 23 is a beard 62 which acts upon the same so as to press the nose 25 when disengaged from the grooves or channels 26 into the shallow groove 61 while the lock is operated, so as to prevent the drawing of the turning head or stem 20 from the tube 10 should a pull be exerted upon the cap 22 with a view of extracting the lock from the head of the motorcycle or bicycle, it being apparent that when the nose 25 is engaged in either of the grooves or channels 26 it will be impossible to extract the stem or rod 20 from the said head of the bicycle or motorcycle.

In the operation of the lock normally the locking push pin 46 and 46' are engaged in the respective sockets 51 in the cap 22 so that the rod 20 has been turned to move the locking bolt 40 to released position out of engagement from the segment 43, and in this position the spring 17 has become tensioned and the rod or stem 20 has been locked against turning movement by the engagement of the nose 25 in one of the channels or grooves 26, the slide 28 being in a position at this time so that its nib 29 will engage the lip 30 on the dog or trigger 23 to hold it against release, thus the lock in this manner is set so as to permit the free turning of the column or stem B of the front fork C of the motorcycle or bicycle for the steering thereof by the handle bar in the usual well-known manner. Now, should it be desired to lock the wheel across the straight line of travel thereof, it is only necessary to insert the key in the keyway 21, and on pressing inwardly upon the key the wing 54 and lug 58 thereof will displace the respective headed push pin 52 and the ball 53 so as to move the locking push pins 46 and 46' flush with the head 13, and also the locking push pin 49 on the turning of the cap 22 will be moved flush with the head 13 under the action of the pin 52 and ball 53 so as not to retard the turning of the cap 22 by the said key, and when this is done the rod or stem 20 is simultaneously turned thereby as the bit 55 of the key will shift the slide 28 to free the trigger or dog 23, and the shoulder 56 on the bit will rock the latter to disengage the nose 25 from the channel or groove 26 in which it engages, so that by the turning of the rod or stem 20 the locking bolt 40 will be thrown for its engagement in the recess 44 in the segment 43. Should it be desired to set the lock so that it will be unnecessary to use the key whereby the lock will automatically operate for the securing of the steering column B in a position to have the wheel in the front fork C at an angle to the straight line of travel thereof, it is necessary that the cap 22 be turned so that the locking push pin 49 will engage in the socket 51 containing the headed push pin 52 carried by the cap 22, and in this position the trigger or dog 23 will have its nose 25 engaged in the annular groove 61, but the slide 28 will not at this time have its nib 29 engaged with the lip 30 of the said trigger or dog 23, the locking bolt 40 being now out of engagement with the recess 44 in the segment 43, so that on depressing the headed pin 52 in the cap 22 the locking push pin 49 will be moved to unlatched position, and the tension of the spring 17 will automatically act upon the turning rod or stem 20 to move the locking bolt 40 into engagement in the recess 44 in the segment 43, and thereby locking the wheel in the front fork at an angle to the natural line of travel thereof. At all times to unlock the lock the key will have to be used.

It is of course understood that the lock can be mounted in a bicycle steering column or the steering post of an automobile or other vehicle.

What is claimed is:—

1. A lock for a steering column having a stationary frame head comprising a tube adapted to be secured within the column, a turning rod held within the tube, a sleeve loosely telescoped upon the inner end of the tube and splined upon the rod, an eccentric adjustably connected with the sleeve, a yoke actuated by the eccentric, a locking bolt carried by the yoke and engageable with the frame head for the column for locking the latter against turning, and key releasable means carried by the tube and rod for holding the same locked with each other.

2. A lock for a steering column having a stationary frame head comprising a tube adapted to be secured within the column, a turning rod held within the tube, a sleeve loosely telescoped upon the inner end of the tube and splined upon the rod, an eccentric adjustably connected with the sleeve, a yoke actuated by the eccentric, a locking bolt carried by the yoke and engageable with the frame head for the column for locking the latter against turning, key releasable means carried by the tube and rod for holding the same locked with each other, and means for tensioning the sleeve.

3. A lock for a steering column comprising interfitting members adapted to be mounted within the column, means carried by one of the members and engageable with the other member for locking the same against relative movement, an eccentric operated by one of the members, a locking bolt controlled by the movement of the eccentric, a head on one of the members, a cap on the other member and inclosing the head, locking means carried in the head for engagement with the cap, and a key for simultaneously releasing the first and last named locking means for the turning of one member within the other to actuate the eccentric.

4. A lock for a steering column comprising interfitting members adapted to be mounted within the column, means carried by one of the members and engageable with the other member for locking the same against relative movement, an eccentric operated by one of the members, a locking bolt controlled by the movement of the eccentric, a head on one of the members, a cap on the other member and inclosing the head, locking means carried in the head for engagement with the cap, a key for simultaneously releasing the first and last named locking means for the turning of one member within the other to actuate the eccentric, and means for tensioning the eccentric.

5. A lock for a steering column comprising interfitting members adapted to be mounted within the column, means carried by one of the members and engageable with the other member for locking the same against relative movement, an eccentric operated by one of the members, a locking bolt controlled by the movement of the eccentric, a head on one of the members, a cap on the other member and inclosing the head, locking means carried by the head for engagement with the cap, a key for simultaneously releasing the first and last named locking means for the turning of one member within the other to actuate the eccentric, means for tensioning the eccentric, and means carried by one of the members for engaging the first-named locking means to hold it in locked position and displaceable by the key for freeing the said locking means.

6. A lock for a steering column comprising interfitting members adapted to be mounted within the column, means carried by one of the members and engageable with the other member for locking the same against relative movement, an eccentric operated by one of the members, a locking bolt controlled by the movement of the eccentric, a head on one of the members, a cap on the other member and inclosing the head, locking means carried by the head for engagement with the cap, a key for simultaneously releasing the first and last named locking means for the turning of one member within the other to actuate the eccentric, means for tensioning the eccentric, means carried by one of the members for engaging the first-named locking means to hold it in locked position and displaceable by the key for freeing the said locking means, and means for permitting adjustment of the eccentric.

7. A lock for a steering column comprising interfitting members adapted to be mounted within the column, means carried by one of the members and engageable with the other member for locking the same against relative movement, an eccentric operated by one of the members, a locking bolt controlled by the movement of the eccentric, a head on one of the members, a cap on the other member and inclosing the head, locking means carried by the head for engagement with the cap, a key for simultaneously releasing the first and last named locking means for the turning of one member within the other to actuate the eccentric, means for tensioning the eccentric, means carried by one of the members for engaging the first-named locking means to hold it in locked position and displaceable by the key for freeing the said locking means, means for permitting the adjustment of the eccentric, and a yoke supporting the bolt and engaged by the eccentric.

In testimony whereof I affix my signature in presence of two witnesses.

GEORGE CROSTON.

Witnesses:
BEATRICE FOSDICK,
C. W. HODGDON.

Copies of this patent may be obtained for five cents each, by addressing the "Commissioner of Patents, Washington, D. C."